United States Patent

[11] 3,575,161

| [72] | Inventor | Seymour B. London<br>35 E. DiLido Drive, Miami Beach, Fla. 33139 |
|---|---|---|
| [21] | Appl. No. | 711,426 |
| [22] | Filed | Mar. 7, 1968 |
| [45] | Patented | Apr. 20, 1971 |

[54] VALVE FOR BIOLOGICAL SYSTEMS
7 Claims, 7 Drawing Figs.

[52] U.S. Cl. .............................................. 128/2.05,
128/214, 128/348, 137/595, 137/636, 251/9
[51] Int. Cl. ................................................. A61b 5/02,
F16l 55/14
[50] Field of Search ................................ 128/2, 2.05,
214, 214.2, 348; 137/636, 595; 251/4—10

[56] References Cited
UNITED STATES PATENTS

| 2,625,932 | 1/1953 | Salisbury | 128/214.2 |
| 2,625,933 | 1/1953 | Salisbury | 128/214.2 |
| 2,645,245 | 7/1953 | Maisch | 251/7X |
| 2,835,252 | 5/1958 | Mauchel | 128/214 |
| 2,895,653 | 7/1959 | Giepen | 251/9X |
| 3,275,831 | 9/1966 | Martin | 350/266X |
| 3,450,152 | 6/1969 | Quellette | 251/9X |
| 3,456,648 | 7/1969 | Lee et al. | 128/214 |
| 3,411,534 | 11/1968 | Rose | 251/9X |

*Primary Examiner*—Dalton L. Truluck
*Attorney*—Semmes & Semmes

ABSTRACT: An electronically controlled, contamination-free valve for biological systems of the type feeding fluid through a plurality of compressible tubes and comprising a rocker arm pivotable so as to compress the tubing and control fluid flow, as a photocell circuit senses variant light transmission characteristics of the fluid feeding through the tubes.

PATENTED APR 20 1971 3,575,161

INVENTOR
SEYMOUR B. LONDON

BY Semmes and Semmes

ATTORNEYS

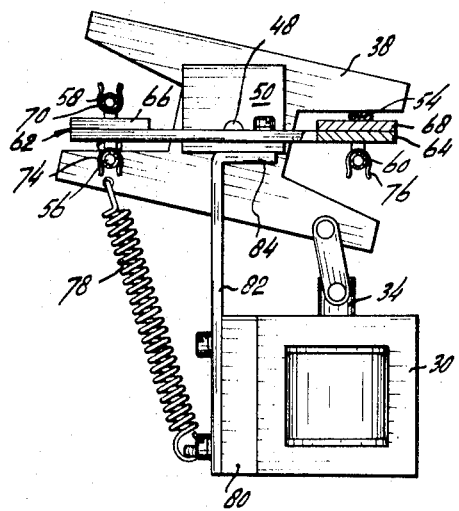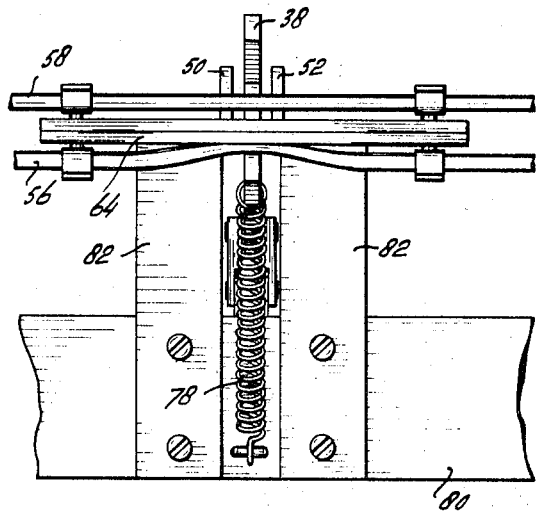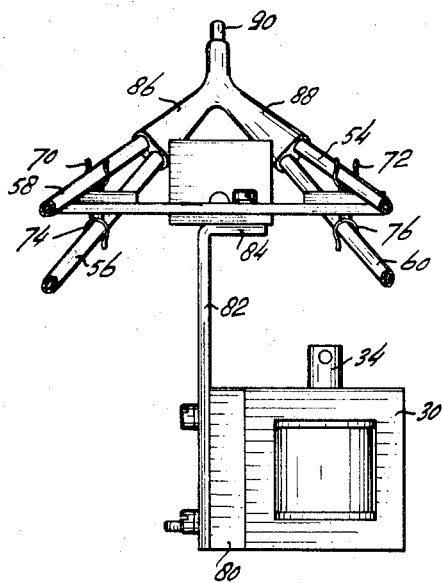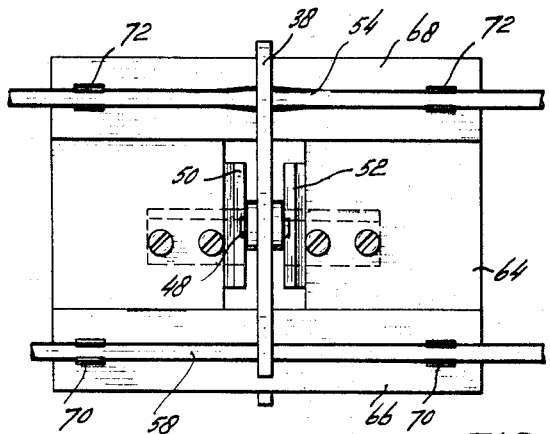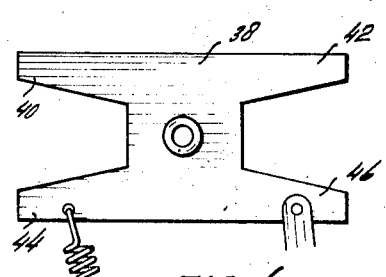

VALVE FOR BIOLOGICAL SYSTEMS

In my copending application entitled, METHOD FOR CENTRAL VENOUS PRESSURE MONITORING, Ser. No. 710,485, filed Feb. 25, 1968, central venous pressure is monitored by means of a photocell circuit positioned adjacent a vertically held liquid-supporting manometer tubing. The photocell circuit senses liquid level changes in the manometer tubing as a function of change in central venous pressure.

The present application is directed to a valve for controlling the flow of medication through compressible tubing in conjunction with biological systems, such as central venous pressure monitoring.

BACKGROUND OF THE INVENTION

1. Field of the Invention

Biological systems in medical diagnosis, measurements and treatment are often a complex of flasks, sensors, transducers, injectors, oscilloscopes, all connected to the patient by a flexible plastic or rubber tubing. It is frequently necessary to shift quickly from one form of therapy or modality of measurement to another. Since these tubings contain sterile fluids which must be maintained free from external contamination by foreign material or bacteria, the flow control of these solutions previously has been manually accomplished by screw or pinch clamps of one type or another. The advent of automation, with the increase in electronic devices and the possibility of therapy programming, has accentuated the problems of management of these complex systems.

2. Description of the Prior Art

The prior art devices have employed light-responsive controls together with tubing-occluding mechanisms; however, these devices have not suggested the use of a photocell circuit controlling a rocker arm to occlude medication flow through a plurality of compressible tubes.

The prior art patents relate for the most part to blood oxygenators, photocells being employed as a control linked to a venous pumping means. Several of the occluding mechanisms, for example Shaweker (U.S. Pat. No. 1,610,622), show the employment of an occluding mechanism based upon the rocker arm principle, that is the opening of one tube, while occluding another tube.

Gibbon (U.S. Pat. No. 2,659,368) teaches the employment of a light-responsive control means associated with a venous pumping mechanism in an oxygenating device. Gobel's (U.S. Pat. No. 2,689,565) occluding mechanism consists principally of cam-actuated depressors 50 and 51. Mauchel (U.S. Pat. No. 2,835,352) employs a photocell and light source to detect difference in opacity of blood being transfused, so as to trap or filter undesirable gas occlusions. Burke (U.S. Pat. No. 2,907,325) teaches the use of the conventional tension spring clasps and clamps. Berkman et al. (U.S. Pat. No. 2,927,582) illustrates an occluder valve mechanism (FIG. 3) in a pump oxygenator. Darling's (U.S. Pat. No. 3,163,176) device is used in a device for sensing and controlling drop flow. Latham (U.S. Pat. No. 3,359,910) in FIG. 2 illustrates a complex cam-operated occluding mechanism. The Giepen (U.S. Pat. No. 2,895,653) device is used in beverage machines as a measuring and dispensing valve.

SUMMARY OF THE INVENTION

The present device is designed to provide an electronically controlled, external pinch clamp valve. This valve acts to compress, closing, and to release, opening the flow of fluid in the flexible disposable tubing conventionally used. The internal composition and sterility of the fluid is maintained and no additional precautions or manipulation for protection from contamination of fluid or equipment is needed.

Since there is often need for an explosion-free environment, this external clamp is activated by simple changes in voltage or current without open contacts or spark hazards. The circuitry is simple and modifications are possible. For example, a signal from any voltage source can be amplified and used to close a solid-state sensitive switch. In the presently illustrated example, a signal lamp is used to excite a photocell. The latter triggers the gate of an SCR (Silicon Control Rectifier) switch. The SCR-sensitive switch closes the circuit to a solenoid which by electromagnetic force "pulls in" a piston. This solenoid piston is connected to a forked rocker and causes the latter to pivot through a small arc. The rocker is positioned so that as the rocker arm rotates through its small arc, each rocker arm compresses or releases compression, occluding or opening flow in the compressible tubing. There is a spring return to the rocker which pivots back to its original state (when the solenoid current is interrupted).

Four separate solutions can thus be controlled by one solenoid. By Y-connections between these tubes, a manifold is formed, and all solutions channeled into one single intravenous or intracardiac tubing leading to the patient. While this valve is described as used in medical applications, this is nonexclusive, since the valve is also ideally suited for use where the internal environment and sterility of tubing must be preserved and the flow through these tubings controlled.

BRIEF DESCRIPTION OF THE DRAWINGS

FIG. 3 is a front elevation of a pivoted rocker arm, shown occluding tubing 54 and 56, as the solenoid 34 is actuated;

FIG. 4 is a side elevation showing support of the tubing by tubing clips secured in platform 64;

FIG. 5 is a top plan of the platform;

FIG. 6 is a front elevation of the rocker arm, having a medial pivoting aperture and radially extending arms 40, 42, 44 and 46; and FIG. 7 is a front elevation with the rocker arm removed, showing the connection of four compressible tubes by Y-tubes as a manifold leading to the cardiac catheter.

DESCRIPTION OF THE PREFERRED EMBODIMENTS

Figure 2:
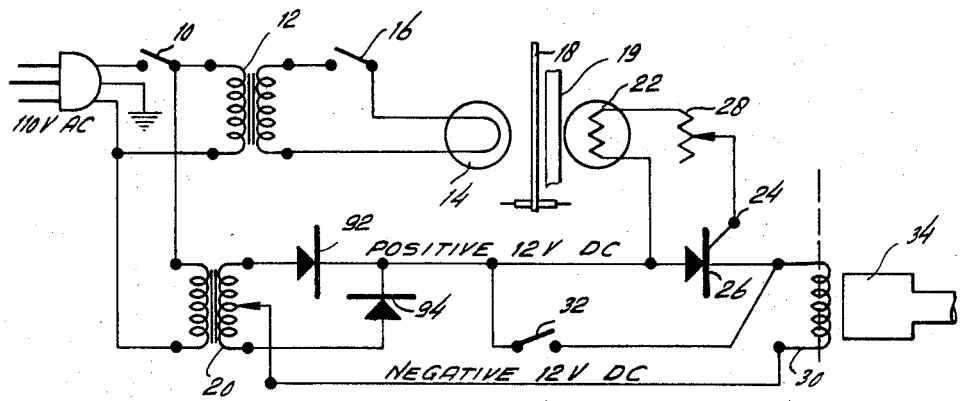
FIG. 2 is a circuit diagram of a proposed photocell circuit used in connection with a rocker arm actuated solenoid piston 34.

This is a nonexclusive example of the circuitry of the electronic valve using a low-voltage signal lamp and photocell circuit as a triggering signal for an SCR electronic switch, SW 3. In FIG. 2 switch 10 is an off-on switch for the 110 volt AC current. Transformer 12 provides 6 volt AC current for exciter lamp 14. Switch 16 can be any switching device, electronic or mechanical to close the circuit to lamp 14. When the circuit to lamp 14 is closed, lamp 14 is illuminated but shielded by shutter 18. This lamp-photocell circuit is one means of providing a sparkless switching signal. Rectified but unfiltered positive 12 volt DC is provided by transformer 20, to the photocell 22. The latter in turn supplies the gate 24 to SCR 29 with a positive bias as a triggering signal. Sensitivity of the gate is controlled by potentiometer 28. Light from the illumination of lamp 14 transmitted through clear plastic manometer tubing 19 drops the internal resistance of the photocell 22, causing increased current to appear at the gate of SCR 26 which acts as a switch. The SCR 26 is caused, therefore, to conduct, closing the 12 volt DC circuit to solenoid 30. As long as a positive bias is present at the gate of SCR 26 the SCR will continue to conduct, closing the solenoid 30 circuit and "pulling" piston 34.

As an alternative to the electronic switching illustrated by SCR 26, solenoid 30 can be controlled by manual pushbutton or other form of switch 32 or by manipulation of the shutter 18.

When the 12 volt DC solenoid circuit is closed, the solenoid piston 34, FIG. 2, is pulled into the solenoid housing 30 by electromagnetic force. The rocker 38 having arms 40, 42, 44 and 46 is rotated through a short arc on pivot 48 secured in supports 50 and 52. Rocker arm 38 pressure on tubing 54 and 56, compresses the tubing and fluid flow is stopped through these tubes. Simultaneously, pressure is released on tubes 58 and 60 and flow is started in these tubes 58 and 60. The current supplying the SCR 26-solenoid 30 circuit via transformer 20, 12 volt DC positive, is rectified by diodes 92 and 94 but not filtered, and therefore, if lamp 14 is extinguished, and the bias to gate 24 is interrupted, SCR 26 will open, and the current to the solenoid 30 will be interrupted.

Platform 62, as illustrated in FIGS. 2 and 3, includes a rigid table 64 and outer frame pieces 66 and 68 to support the intravenous tubings 54, 56, 58 and 60, maintained in proper position by pairs of flexible clips 70, 72, 74 and 76 so that the pivoting of the rocker arm 38 will occlude and release the flow through these tubings depending upon the position of the solenoid piston 34. Rocker arm 38 may be maintained in a solenoid "off" position by a tension spring return 78, which pivots the rocker arm 38 back when the solenoid is not activated. Rigid table 64 may be vertically adjustably supported by means of bracket 84 secured to stand 82 supported in base 80.

Figure 1:
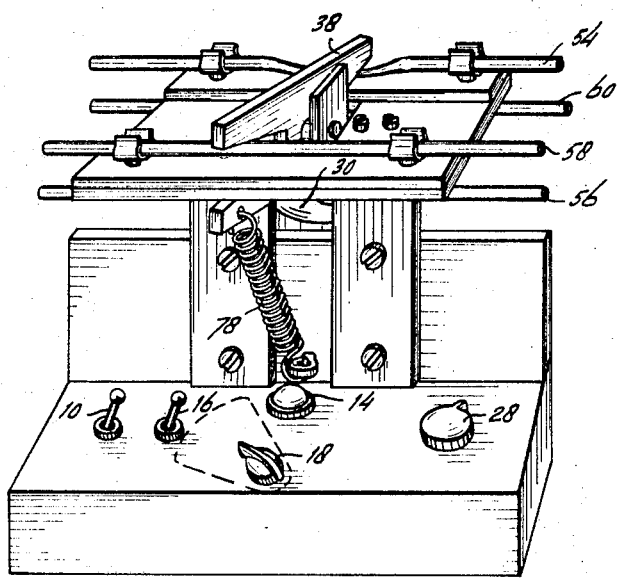
FIG. 1 is a perspective of a proposed rocker arm unit and control panel.

When an external rocker arm valve according to the present invention is used in conjunction with a venous pressure monitor, as described in my aforementioned copending application, for automatic programming of therapy during alarm conditions, tubing 54, 56, 58 and 60 from the various reservoirs is held in place on the valve platform or table 64 by nonoccluding clips 70, 72, 74 and 76. Many variations and arrangements are possible, but as illustrated in FIG. 1 herein, flow through the four separate tubings can be controlled by this external valve. One feasible arrangement is to place the tubing 54 from a manometer in clip 72, and the tubing 56 from a saline reservoir flushing flask in clip 74 (See FIG. 3). Tubings 58 and 60 may lead from separate reservoirs or flasks (not illustrated) and would contain preselected fluids or medications. Flow through these tubings from the reservoirs may be controlled by additional separate standard screw clamps (not illustrated). By connecting tubing 58 to tubing 56 by Y-tube 86, tubing 60 to tubing 54 by Y-tube 88, tubing 58 and 60 become alternate supplies for the cardiac catheter, 90 (shown fragmentarily). When the solenoid 30 is activated, rocker arm 38 is pulled down, as illustrated in FIG. 1. In this so-called active condition of the rocker arm valve, tubing 54 and 56 are occluded, while flow from the tubing 58 and 60 is released to enter the circulation via the cardiac catheter 90.

Manifestly, the photocell exciter circuit as well as the rocker arm arrangement may be varied without departing from the spirit of the invention.

I claim:

1. An electrically controlled, contamination-free valve for systems of the type feeding fluid through compressible tubes and comprising:
    A. a base supporting said tubes;
    B. a plurality of tubes adapted to extend from a patient to a source of fluid supply, a compressible portion of said tubes extending across said base;
    C. a rocker member pivoted in said base having a rocker arm above said base and a rocker arm below said base;
    D. two of said compressible tubes being resiliently supported upon the top of said base, and two of said tubes being resiliently supported upon the bottom of said base, so that said rocker arm on pivoting simultaneously engages and compresses on the opposite sides of said base one of said top tubes and one of said bottom tubes, and alternately the other ones of said top and bottom tubes while disengaging and releasing the others of said tubes;
    E. an electrical supporting system including:
        i. an electronically energizable solenoid connected to said rocker, so as to pivot said rocker and compress and release said tubes upon electrical energization;
        ii. a light exciter source and opposed photocell positioned on opposite sides of one of said tubes, said photocell being connected to said solenoid, so as to activate said solenoid and pivot said rocker as light transmitted by said light exciter through said tubing is sensed by the opposed photocell.

2. A valve as in claim 1, said light exciter source and photocell circuit including:
    i. a shutter positioned between said lamp exciter source and said photocell; and
    ii. a manual switch overriding said lamp exciter and photocell circuit to energize said solenoid.

3. A valve as in claim 1, said base being height adjustable and having a pivoting surface extending medially through said rocker.

4. A valve as in claim 1, said rocker arm including: four radially extending rocker arms, diametrically opposed rocker arms being simultaneously compressible against said tubing upon pivoting of said rocker.

5. A valve as in claim 4, wherein at least two of said tubes are conjoined by Y-tubing as a manifold.

6. A valve as in claim 5, wherein four tubes are positioned upon said base for compression by four radially extending arms of said rocker arm and are conjoined by means of Y-tubes to a cardiac catheter.

7. A valve as in claim 6, including tension spring means interconnecting said rocker arm and said base, so as to return said rocker arm to nonoccluding position when said solenoid is "off."